US010030762B2

(12) United States Patent
Jones et al.

(10) Patent No.: US 10,030,762 B2
(45) Date of Patent: Jul. 24, 2018

(54) GATE BLOCKER (71) Applicant: Ficosa North America Corporation, Madison Heights, MI (US)

(72) Inventors: Jeffrey Lee Jones, Rochester Hills, MI (US); Vijay Thota, Troy, MI (US); Javier Alvarez Rubio, Madison Heights, MI (US)

(73) Assignee: Ficosa North America Corporation, Madison Heights, MI (US)

( * ) Notice: Subject to any disclaimer, the term of this patent is extended or adjusted under 35 U.S.C. 154(b) by 288 days.

(21) Appl. No.: 14/829,484

(22) Filed: Aug. 18, 2015

(65) Prior Publication Data

US 2017/0051824 A1  Feb. 23, 2017

(51) Int. Cl.
*F16H 59/10* (2006.01)
*F16H 59/02* (2006.01)
*F16H 59/08* (2006.01)
*F16H 61/22* (2006.01)

(52) U.S. Cl.
CPC .............. *F16H 59/10* (2013.01); *F16H 59/02* (2013.01); *F16H 59/0204* (2013.01); *F16H 59/08* (2013.01); *F16H 59/105* (2013.01); *F16H 61/22* (2013.01)

(58) Field of Classification Search
CPC ........ F16H 59/10; F16H 61/22; F16H 59/105; F16H 59/0204; F16H 59/02; F16H 59/08
See application file for complete search history.

(56) References Cited

U.S. PATENT DOCUMENTS

| 3,570,320 A * | 3/1971 | MacAfee, et al. | F16H 59/00 74/473.21 |
| 2012/0103122 A1 | 5/2012 | Morrissett | |
| 2014/0165764 A1* | 6/2014 | Moon | F16H 59/10 74/473.21 |

FOREIGN PATENT DOCUMENTS

JP         S53104527 U  *  8/1978

* cited by examiner

*Primary Examiner* — Victor L MacArthur
(74) *Attorney, Agent, or Firm* — Foley & Lardner LLP (57) ABSTRACT

A gear selector assembly includes a shift gate including a plurality of gates, a gear selector movable between the plurality of gates and including a pawl, and a gate blocker positioned to restrictively interact with the pawl of the gear selector to selectively restrict movement of the gear selector through a first gate to a second gate. The gate blocker includes a biasing member configured to bias the gate blocker towards a nominal position. The gate blocker is configured to not restrictively interact with the pawl to allow the gear selector to move from the first gate to the second gate when the gate blocker is in the nominal position. Each gate of the shift gate is associated with a mode of operation of a vehicle.

13 Claims, 7 Drawing Sheets

GATE BLOCKER

BACKGROUND

Vehicles with automatic transmissions typically include gear selector assemblies that are used by an operator to shift the transmission into various modes of operation. However, the operator may inadvertently shift the transmission into an undesired mode of operation. For example, the operator may unintentionally or unknowingly shift from a park mode to a manual mode, overshooting a drive mode. This overshoot may cause an unaware operator to unnecessarily increase the speed of the engine while accelerating.

SUMMARY

One embodiment relates to a gear selector assembly. The gear selector assembly includes a shift gate including a plurality of gates, a gear selector movable between the plurality of gates and including a pawl, and a gate blocker positioned to restrictively interact with the pawl of the gear selector to selectively restrict movement of the gear selector through a first gate to a second gate. The gate blocker includes a biasing member configured to bias the gate blocker towards a nominal position. The gate blocker is configured to not restrictively interact with the pawl to allow the gear selector to move from the first gate to the second gate when the gate blocker is in the nominal position. Each gate of the shift gate is associated with a mode of operation of a vehicle.

Another embodiment relates to a method of reconfiguring a gear selector assembly. The method includes providing a gear selector assembly with a shift gate including a plurality of gates and a gear selector configured to be repositioned between the plurality of gates, performing a first motion to reposition the gear selector from a first gate to a second gate, and performing a second motion to reposition the gear selector from the second gate to a third gate. The gear selector is prevented from being directly repositioned from the first gate to the third gate by at least one of a surface of the second gate and a blocking device adjacent the second gate. The blocking device is rotationally biased towards a nominal position such that the blocking device does not prevent the gear selector from being repositioned from the second gate to the third gate while performing the second motion. The first gate is associated with a first mode of operation, the second gate is associated with a second mode of operation, and the third gate is associated with a third mode of operation.

Still another embodiment relates to a blocking member of a gear selector assembly. The blocking member includes a leg and a biasing member. The leg is configured to restrictively interact with a movable portion of a gear selector when the movable portion is in a first position (e.g., an extended position, etc.) to selectively restrict movement of the gear selector through a portion of a shift gate of the gear selector assembly. The biasing member is configured to bias the leg towards a nominal position. According to an exemplary embodiment, the leg does not restrictively interact with the movable portion of the gear selector as the gear selector is moved through the portion of the shift gate when the leg is in the nominal position and the movable portion of the gear selector is in a second position (e.g., a retracted position, etc.).

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a gear selector assembly includes a shift gate that defines a plurality of indentations, positions, and/or gates. Each of the plurality of indentations, positions, and/or gates represents a mode of operation of a vehicle (e.g., park, reverse, neutral, drive, manual, sport, low, etc.). A traditional gear selector assembly may allow an operator of the vehicle to inadvertently shift the gear selector assembly into an undesired mode of operation. For example, an operator may shift from a first mode of operation (e.g., park, neutral, reverse, etc.) into a manual mode of operation, inadvertently passing a drive mode of operation. Unknowingly shifting a transmission of a vehicle into a manual mode of operation may provide for undesirable operation of the vehicle. For example, an operator may highly and unnecessarily push an engine of a vehicle to a substantially high engine speed (e.g., revolutions-per-minute (RPM), etc.) if the operator is unaware of a requirement to manually shift the transmission (e.g., by some actuation of the gear selector, etc.) when inadvertently in a manual mode of operation. Embodiments of the inventive concepts disclosed herein relate to a gear selector assembly that is configured to prevent inadvertent selection of certain shift positions (e.g., modes of operation, etc.). The gear selector assembly shown in various embodiments includes a blocking device (e.g., a gate blocker, etc.) that acts as a movable stop that prevents inadvertent gear selection (e.g., from a park mode of operation to a manual mode of operation, etc.). In some embodiments, shifting the gear selector assembly into a manual mode of operation includes two distinct operations (e.g., two separate movements, two actuations, etc.), thereby causing an operator to perform a conscious and desired selection of the manual mode of operation.

According to the exemplary embodiment shown in FIGS. 1-6, a vehicle includes a gear selector assembly, shown as gear selector assembly 30. The gear selector assembly 30 is configured to provide an operator of the vehicle with the ability to select a desired vehicle/transmission mode of operation. By way of example, an operator may desire to drive the vehicle in reverse (e.g., to back out of a parking spot, a garage, etc.). Thus, the operator may selectively shift the gear selector assembly 30 into a reverse position to shift the transmission into a reverse mode of operation. By way of another example, an operator may desire to drive the vehicle forward. Thus, the operator may selectively shift the gear selector assembly 30 into a drive position to shift the transmission into a drive mode of operation.

Figure 1:
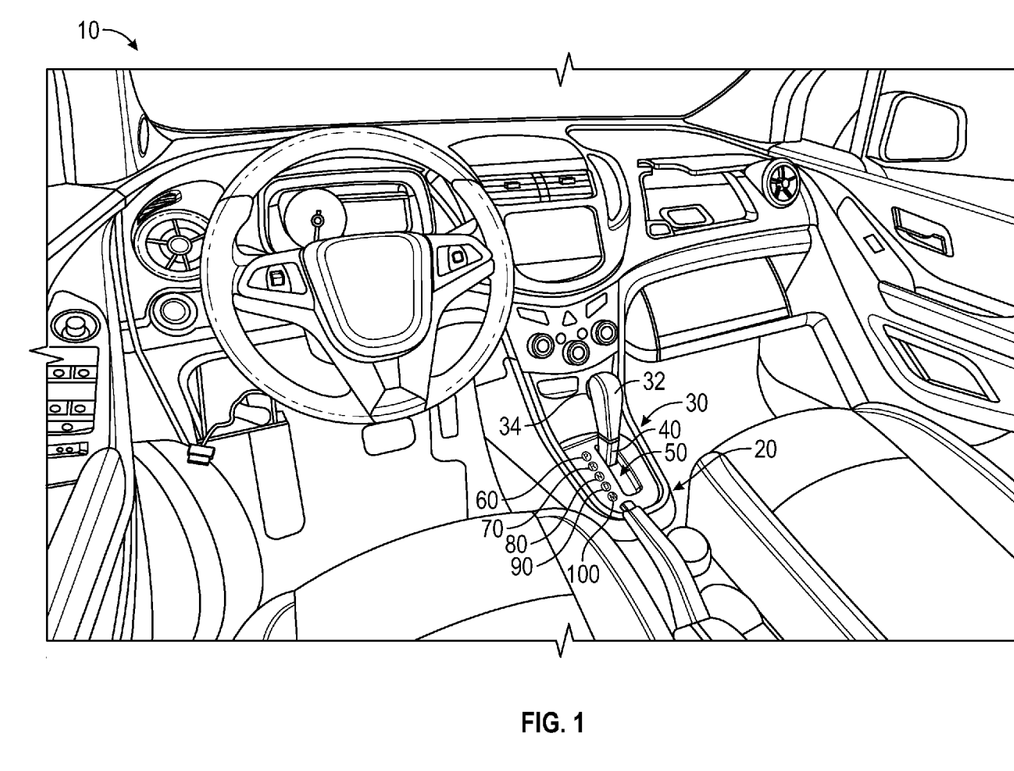
FIG. 1 is a perspective view of a vehicle interior with a gear selector assembly, according to an exemplary embodiment.

As shown in FIG. 1, the gear selector assembly 30 is disposed along a console, shown as center console 20, within an interior, shown as vehicle interior 10, of the vehicle. By way of example, the gear selector assembly 30 may be coupled to a transmission of the vehicle positioned beneath the center console 20. In alternative embodiments, the gear selector assembly 30 is positioned elsewhere within the vehicle interior 10. For example, the gear selector assembly 30 may be positioned on a steering assembly of the vehicle (e.g., a column shifter, etc.). According to an exemplary embodiment, the gear selector assembly 30 is configured as a straight gear selector assembly. In another embodiment, the gear selector assembly 30 is otherwise configured. For example, the gear selector assembly 30 may be configured as a column gear selector assembly, a rotary gear selector assembly, or a serpentine gear selector assembly, among other possibilities.

As shown in FIG. 1, the gear selector assembly 30 includes a gear selector including a lever handle, shown as shift knob 32; a button, shown as shift button 34; and a gear lever, shown as shift lever 40. The gear selector assembly 30 also includes a shift gate, shown as shift gate 50. The shift knob 32 provides an operator of the vehicle with a handle to grasp when the operator desires to reposition the shift lever 40 of the gear selector assembly 30 into various positions. The various positions of the gear selector assembly 30 are defined by the shift gate 50, according to an exemplary embodiment. The shift button 34 may facilitate the shifting of the gear selector assembly 30 into a desired position of the various positions defined by the shift gate 50. According to an exemplary embodiment, the shift gate 50 is configured as a straight shift gate. In another embodiment, the shift gate 50 is otherwise configured. For example, the shift gate 50 may be configured as a J-gate, an H-gate, or a manual gate, among other possibilities. According to an example embodiment, the shift gate 50 is fifty millimeters wide. In other embodiments, the shift gate 50 is greater than or less than fifty millimeters wide.

According to an exemplary embodiment, each of the various positions of the gear selector assembly 30 correspond with a mode of operation of the transmission and/or vehicle. As shown in FIG. 1, the gear selector assembly 30 may be shifted by an operator into one of a first position corresponding to a first mode of operation, shown as park mode of operation 60; a second position corresponding to a second mode of operation, shown as reverse mode of operation 70; a third position corresponding to a third mode of operation, shown as neutral mode of operation 80; a fourth position corresponding to a fourth mode of operation, shown as drive mode of operation 90; and a fifth position corresponding to a fifth mode of operation, shown as alternate mode of operation 100. In some embodiments, the gear selector assembly 30 may be shifted into more than five positions. For example, the gear selector assembly 30 may be able to be shifted into a fifth position corresponding to a first alternate mode of operation 100, a sixth position corresponding to a second alternate mode of operation 100, and so on.

According to an exemplary embodiment, the alternate mode of operation 100 includes, but is not limited to, a manual mode of operation, a sport mode of operation, a low mode of operation, a weather based mode of operation, a terrain based mode of operation, and/or the like. The manual mode of operation may reconfigure a controller of the vehicle to allow an operator to choose when the transmission shifts between gears (e.g., substantially similar to a vehicle with a manual transmission, prevent the controller from determining when to shift between gears, via an upshift actuation, via a downshift actuation, etc.). The sport mode of operation may reconfigure the controller of the vehicle to allow for greater engine output power (e.g., torque, horsepower, engine speed, etc.). The low mode of operation may reconfigure the controller of the vehicle to hold the transmission in a lower ratio for climbing steep grades, heavy acceleration, and the like. The weather based mode of operation may reconfigure the controller of the vehicle to alter vehicle performance (e.g., power, etc.) or vehicle configuration (e.g., four-wheel drive, traction control, etc.) based on the weather (e.g., snow, rain, etc.). The terrain based mode of operation may reconfigure the controller of the vehicle to account for various different driving surfaces (e.g., dirt, sand, gravel, etc.).

Referring now to FIGS. 2A-6, the shift lever 40, the shift gate 50, and other internal components of the gear selector assembly 30 are shown in greater detail. As shown in FIG. 2B-6, the shift lever 40 defines a slot, shown as pawl slot 42. The pawl slot 42 is configured to receive a movable portion of the shift lever 40, shown as pawl 44. As shown in FIG. 2B-6, the pawl 44 is repositionable between a first position, shown as retracted position 46, and a second position, shown as extended position 48. In other embodiments, the retracted position 46 may be referred to as the second position and the extended position 48 may be referred to as the first position. According to the exemplary embodiment shown in FIGS. 2A-2B, actuating the shift button 34 repositions the pawl 44 from the retracted position 46 to the extended position 48. Actuating the shift button 34 facilitates repositioning the shift lever 40 within the shift gate 50, according to an exemplary embodiment. In some embodiments, actuating the shift button 34 to reposition the pawl 44 may involve an operator having to actuate a brake pedal of the vehicle simultaneously (e.g., to prevent an operator from shifting from a driving mode to a park mode while the vehicle is moving, etc.).

Figure 2A:
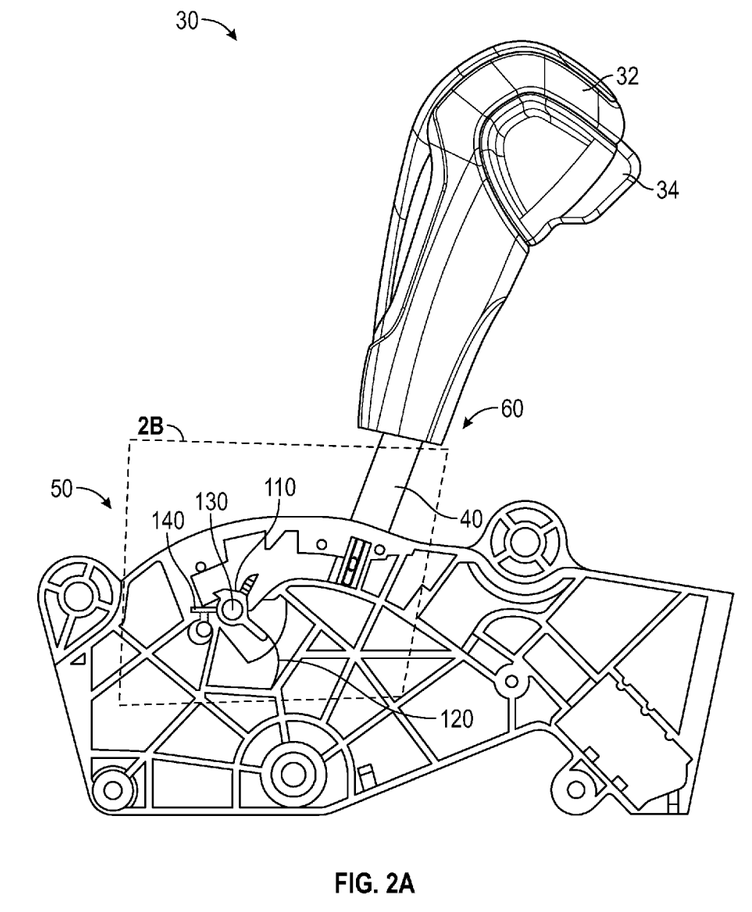
FIG. 2A is a cross-sectional view of the gear selector assembly of FIG. 1 in a park position, according to an exemplary embodiment.
Figure 2B:
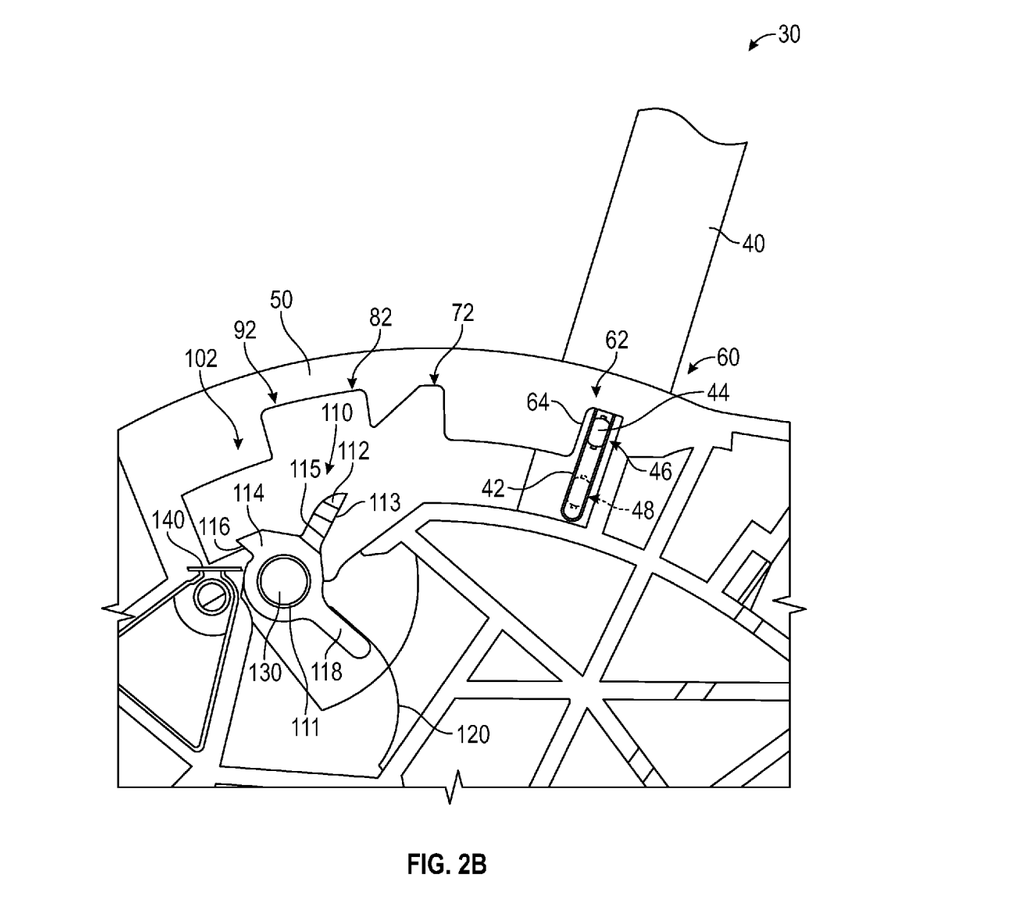
FIG. 2B is a detailed cross-sectional view of the gear selector assembly of FIG. 2A, according to an exemplary embodiment.

As shown in FIGS. 2A-2B, the shift gate 50 defines a plurality of gates. According to an exemplary embodiment, each of the plurality of gates is associated with a mode of operation of a transmission and/or a vehicle. As shown in FIG. 2B, the shift gate 50 defines a first gate, shown as park gate 62; a second gate, shown as reverse gate 72; a third gate, shown as neutral gate 82; a fourth gate, shown as drive gate 92; and a fifth gate, shown as alternate gate 102. According to an exemplary embodiment, the park gate 62 is associated with the park mode of operation 60, the reverse gate 72 is associated with the reverse mode of operation 70, the neutral gate 82 is associated with the neutral mode of operation 80, the drive gate 92 is associated with the drive mode of operation 90, and the alternate gate 102 is associated with the alternate mode of operation 100 (e.g., low/manual/sport (L/M/S) mode of operation, etc.). In some embodiments, the shift gate 50 defines a plurality of alternate gates 102 associated with a plurality of alternate modes of operation 100 (e.g., a low gate associated with a low mode of operation and a manual/sport gate associated with a manual/sport mode of operation, etc.).

As shown in FIGS. 2A-6, the gear selector assembly 30 includes a blocking member, shown as gate blocker 110. The gate blocker 110 is configured to selectively restrict movement of the shift lever 40 through at least a portion of the shift gate 50. The gate blocker 110 may be constructed from any suitable material such as metal, plastic, or composites, among other materials. As shown in FIGS. 2A-2B, gate blocker 110 includes a single, unitary structure. In an alternative embodiment, the gate blocker 110 includes two or more components coupled together (e.g., welded, glued, fastened, etc.). As shown in FIG. 2B, the gate blocker 110 includes a first leg, shown as leg 112, a second leg, shown as leg 114, and a third leg, shown as leg 118 that extend from a body of the gate blocker 110. The legs 112, 114, and 118 are circumferentially offset from each other, according to the exemplary embodiment. As shown in FIG. 2B, the body of the gate blocker 110 defines an aperture, shown as aperture 111. According to an exemplary embodiment, shift gate 50 defines a corresponding aperture positioned to align with the aperture 111 of the gate blocker 110 when coupled to the shift gate 50. In one embodiment, the aperture 111 and the corresponding aperture of the shift gate 50 receive a fastener, shown as pin 130, to couple the gate blocker 110 to the shift gate 50. The pin 130 may facilitate the rotation of gate blocker 110 relative to the shift gate 50. In other embodiments, the gate blocker 110 is otherwise coupled to the shift gate 50. For example, the gate blocker 110 may be coupled to the shift gate 50 such that the gate blocker 110 translates linearly relative to the shift gate 50 (e.g., laterally, longitudinally, vertically, etc.) rather than rotate relative to the shift gate 50.

According to an exemplary embodiment, the gate blocker 110 is positioned along the shift gate 50 such the leg 112 interacts with the pawl 44 while the pawl 44 is in the extended position 48. An interaction of the pawl 44 with a first surface 113 of the leg 112 may selectively restrict the movement of the shift lever 40 through a portion of the shift gate 50 in a first direction while the pawl 44 is in the extended position 48 (e.g., restricts movement of the shift lever 40 through the drive gate 92 to the alternate gate 102, etc.). Conversely, an interaction of the pawl 44 with an opposing second surface 115 of the leg 112 may permit the passage of the shift lever 40 through the portion of the shift gate 50 in an opposing second direction while the pawl 44 is in the extended position 48 (e.g., from the alternate gate 102 to the drive gate 92, etc.).

According to an exemplary embodiment, a surface, shown as interaction surface 116, of the leg 114 is positioned to interact with a surface of the shift gate 50, shown as retaining surface 140. The contact between the interaction surface 116 of the leg 114 and the retaining surface 140 rotationally limits the movement of the gate blocker 110 when the leg 112 interacts with the pawl 44. Rotationally limiting the movement of the gate blocker 110 may effectively restrict the movement of the shift lever 40 through a first gate (e.g., the drive gate 92, etc.) to a second gate (e.g., the alternate gate 102, etc.) of the shift gate 50. In some embodiments, the retaining surface 140 includes a dampening material (e.g., rubber, etc.) configured to reduce at least one of an impact load and noise generated from the contact between the interaction surface 116 of the leg 114 and the retaining surface 140. In an alternative embodiment, the leg 114 is omitted and the leg 112 is structured to abut a corresponding surface of a gate of the shift gate 50 when the pawl 44 interacts with the leg 112. The interaction between the leg 112 and a corresponding gate may rotationally limit the movement of the gate blocker 110 (i.e., close off a passage through a first gate to one or more subsequent gates, etc.).

According to an exemplary embodiment, the gate blocker 110 includes a biasing member, shown as biasing member 120, configured to bias the gate blocker 110 towards a nominal position (e.g., the position shown in FIGS. 2A-2B, etc.). As shown in FIGS. 2A-2B, the biasing member 120 is coupled to the leg 118 of the gate blocker 110. According to an exemplary embodiment, the biasing member 120 is a leaf spring configured to provide a spring force to bias the gate blocker 110 towards the nominal position. In other embodiments, the biasing member 120 is another type of biasing member (e.g., a torsional spring, a compression spring, a weight, etc.). By way of example, biasing member 120 may be a torsional spring configured to provide a rotational spring force to bias the gate blocker 110 towards the nominal position. By way of another example, the biasing member 120 and/or the leg 118 may be or include a weight configured to bias the gate blocker 110 towards the nominal position. According to an exemplary embodiment, the first surface 113 of the leg 112 does not interact with the pawl 44 of the shift lever 40 when the pawl 44 is in the retracted position 46 and the gate blocker 110 is in the nominal position.

As shown in FIGS. 2A-6, the shift lever 40 is configured to be movable (e.g., selectively repositioned by an operator, etc.) between the plurality of gates of the shift gate 50. As shown in FIGS. 2A-2B, the shift lever 40 is positioned to align with the park gate 62 such that the gear selector assembly 30 is in the first position corresponding with the park mode of operation 60. As shown in FIG. 2B, the pawl 44 of the shift lever 40 is positioned within the park gate 62 when the shift lever 40 is aligned with the park gate 62 and the pawl 44 is in the retracted position 46. The park gate 62 defines a surface, shown as retaining surface 64, positioned to restrict the movement of the shift lever 40 from the park gate 62 while the pawl 44 is in the retracted position 46 (e.g., via the interaction between the retaining surface 64 and the pawl 44, etc.). According to an exemplary embodiment, actuating the shift button 34 repositions the pawl 44 of the shift lever 40 into the extended position 48. Repositioning the pawl 44 into the extended position 48 facilitates moving the shift lever 40 from the park gate 62 to another gate of the shift gate 50 (i.e., the retaining surface 64 does not interact with the pawl 44 when the shift lever 40 is moved and the pawl 44 is in the extended position 48). According to an exemplary embodiment, the shift lever 40 is able to be moved directly to the reverse gate 72, the neutral gate 82, or the drive gate 92 once the shift lever 40 is moved from the park gate 62 with the pawl 44 in either the retracted position 46 or the extended position 48 (e.g., shift button 34 does not need to be actuated, etc.).

Figure 3:
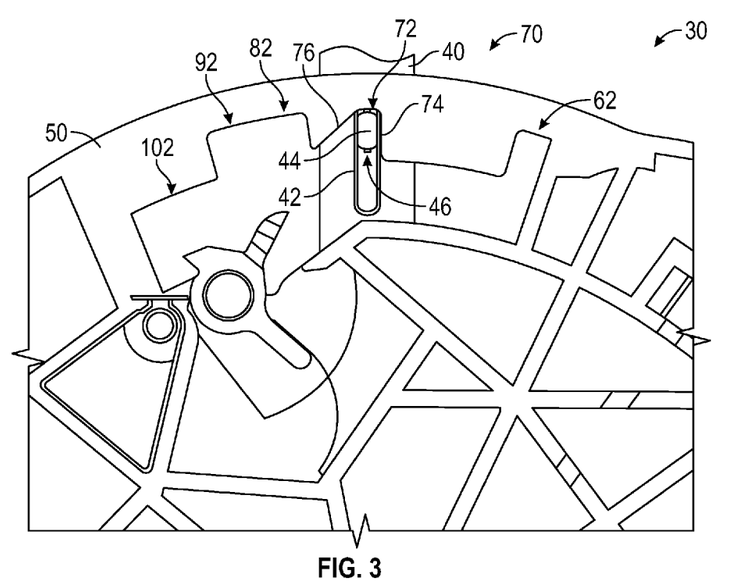
FIG. 3 is a cross-sectional view of the gear selector assembly of FIG. 1 in a reverse position, according to an exemplary embodiment.

Referring now to FIG. 3, the shift lever 40 is positioned to align with the reverse gate 72 such that the gear selector assembly 30 is in the second position corresponding with the reverse mode of operation 70. As shown in FIG. 3, the pawl 44 of the shift lever 40 is positioned within the reverse gate 72 when the shift lever 40 is aligned with the reverse gate 72 and the pawl 44 is in the retracted position 46. In some embodiments, an operator may keep the shift button 34 actuated such that the pawl 44 is in the extended position 48 when the shift lever 40 is aligned with the reverse gate 72 (e.g., while shifting from park to drive, while in the reverse mode of operation 70, etc.). As shown in FIG. 3, the reverse gate 72 defines a first surface, shown as retaining surface 74, and a second surface, shown as chamfered surface 76. The retaining surface 74 is positioned to restrict the movement of the shift lever 40 from the reverse gate 72 to the park gate 62 while the pawl 44 is in the retracted position 46 (e.g., via the interaction between the retaining surface 74 and the pawl 44, etc.). According to an exemplary embodiment, actuating the shift button 34 repositions the pawl 44 of the shift lever 40 into the extended position 48 to facilitate moving the shift lever 40 to the park gate 62 from the reverse gate 72 (i.e., the retaining surface 74 does not interact with the pawl 44 when the shift lever 40 is moved). The chamfered surface 76 is structured such that the shift lever 40 may be moved from the reverse gate 72 to the neutral gate 82 or the drive gate 92 with the pawl 44 in the retracted position 46. According to an exemplary embodiment, the shift lever 40 is able to be moved to the neutral gate 82 or the drive gate 92 from the reverse gate 72 with the pawl 44 in either the retracted position 46 or the extended position 48 (e.g., shift button 34 does not need to be actuated, etc.).

Figure 4:
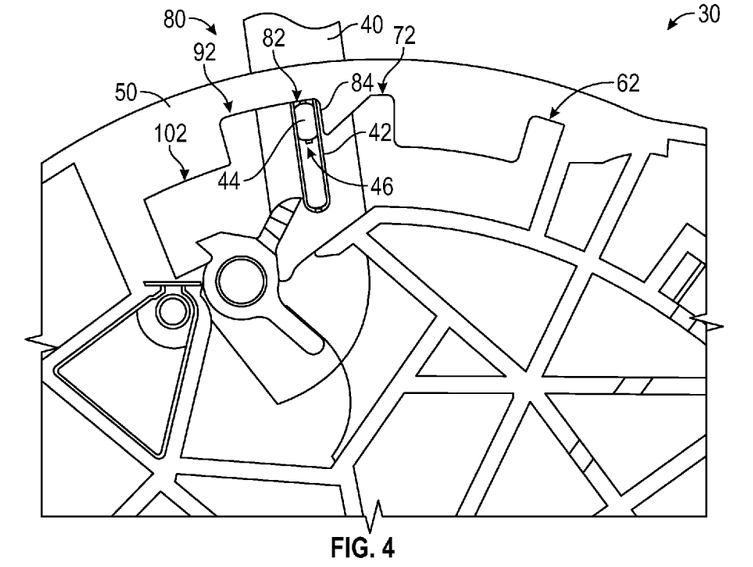
FIG. 4 is a cross-sectional view of the gear selector assembly of FIG. 1 in a neutral position, according to an exemplary embodiment.

Referring now to FIG. 4, the shift lever 40 is positioned to align with the neutral gate 82 such that the gear selector assembly 30 is in the third position corresponding with the neutral mode of operation 80. As shown in FIG. 4, the pawl 44 of the shift lever 40 is positioned within the neutral gate 82 when the shift lever 40 is aligned with the neutral gate 82 and the pawl 44 is in the retracted position 46. In some embodiments, an operator may keep the shift button 34 actuated such that the pawl 44 is in the extended position 48 when the shift lever 40 is aligned with the reverse gate 72 (e.g., while shifting from park to drive, while in the neutral mode of operation 80, etc.). As shown in FIG. 4, the neutral gate 82 defines a surface, shown as retaining surface 84, positioned to restrict the movement of the shift lever 40 from the neutral gate 82 to the reverse gate 72 and/or the park gate 62 while the pawl 44 is in the refracted position 46 (e.g., via the interaction between the retaining surface 84 and the pawl 44, etc.). According to an exemplary embodiment, actuating the shift button 34 repositions the pawl 44 of the shift lever 40 into the extended position 48 to facilitate moving the shift lever 40 to the reverse gate 72 or the park gate 62 from the neutral gate 82 (i.e., the retaining surface 84 does not interact with the pawl 44 when the shift lever 40 is moved). According to an exemplary embodiment, the shift lever 40 is able to be moved to the drive gate 92 from the neutral gate 82 with the pawl 44 in either the retracted position 46 or the extended position 48 (e.g., shift button 34 does not need to be actuated, etc.).

Figure 5A:
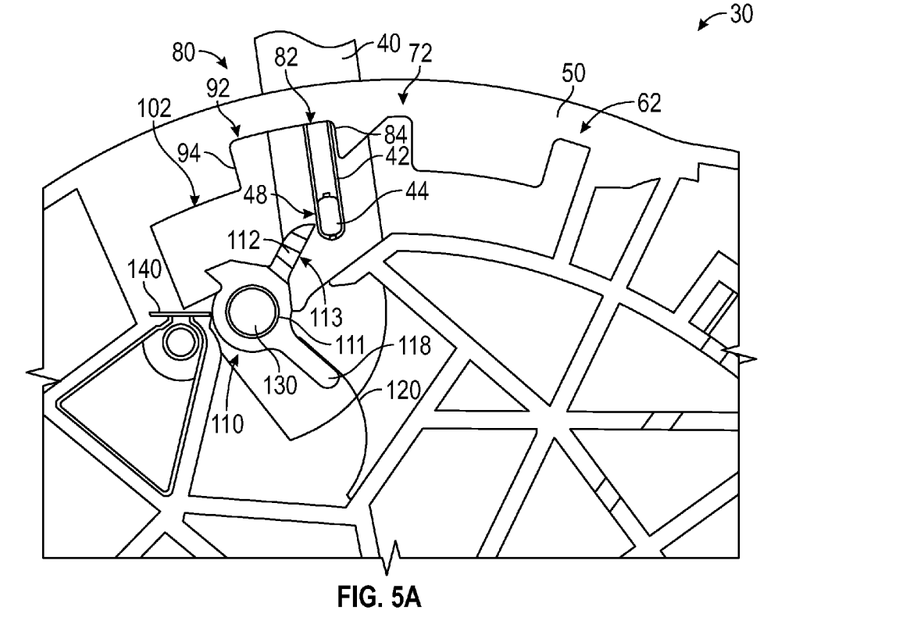
FIGS. 5A-5C are cross-sectional views of the gear selector assembly of FIG. 1 transitioning into a drive position, according to an exemplary embodiment.
Figure 5B:
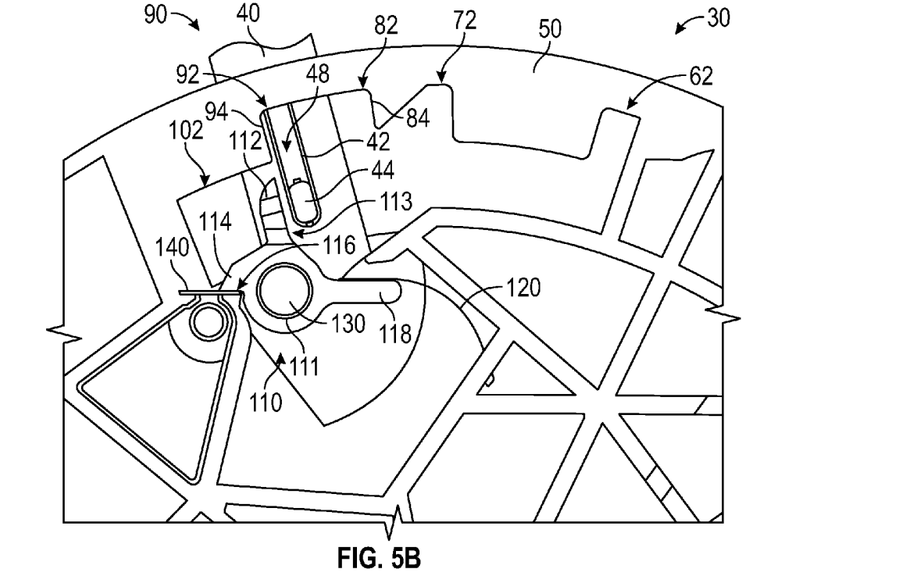
Figure 5C:
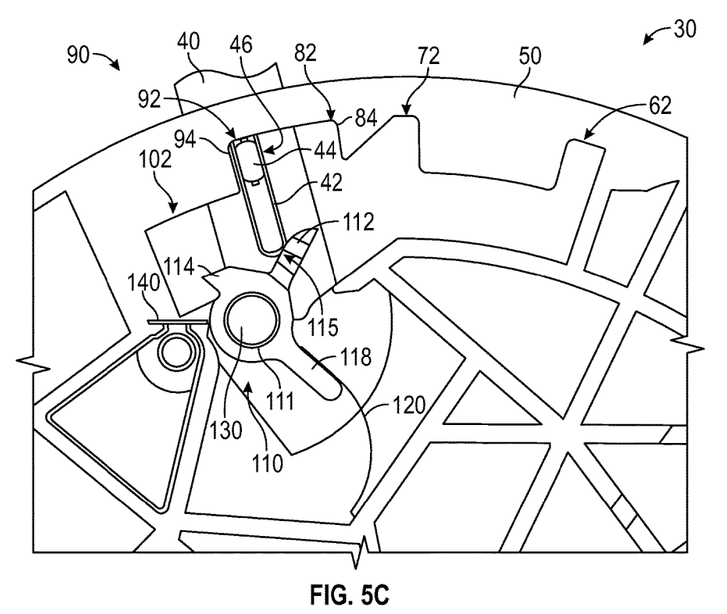

Referring now to FIGS. 5A-5C, the shift lever 40 may be repositioned to align with the drive gate 92 such that the gear selector assembly 30 is in the fourth position corresponding with the drive mode of operation 90. As shown in FIG. 5C, the pawl 44 of the shift lever 40 is positioned within the drive gate 92 when the shift lever 40 is aligned with the drive gate 92 and the pawl 44 is in the retracted position 46. According to an exemplary embodiment, the shift lever 40 is able to be moved to the neutral gate 82 from the drive gate 92 with the pawl 44 in either the retracted position 46 or the extended position 48 (e.g., shift button 34 does not need to be actuated, etc.). According to another exemplary embodiment, actuating the shift button 34 repositions the pawl 44 of the shift lever 40 in the extended position 48 to facilitate moving the shift lever 40 to the reverse gate 72 or the park gate 62 from the drive gate 92 (i.e., the retaining surface 84 of the neutral gate 82 does not interact with the pawl 44 when the shift lever 40 is moved).

According to an exemplary embodiment, the shift gate 50 is structured to allow the shift lever 40 to be repositioned into any of the reverse gate 72, the neutral gate 82, and the drive gate 92 after being moved from the park gate 62 (e.g., by actuating the shift button 34 to reposition the pawl 44 into the extended position 48, etc.). According to an exemplary embodiment, the shift lever 40 may not be repositioned into the alternate gate 102 from the park gate 62, the reverse gate 72, or the neutral gate 82. In some instances, an operator may release the shift button 34 after moving the shift lever 40 from the park gate 62 while shifting the gear selector assembly 30. Thus, the pawl 44 may follow along the shift gate 50 as the shift lever 40 is selectively repositioned along the shift gate 50. As shown in FIG. 5A-5C, the drive gate 92 defines a surface, shown as retaining surface 94, positioned to restrict the movement of the shift lever 40 from the drive gate 92 to the alternate gate 102 when the pawl 44 is in the retracted position 46 (e.g., via the interaction between the retaining surface 94 and the pawl 44, etc.). Thus, the retaining surface 94 is positioned to prevent directly repositioning the shift lever 40 from any of the park gate 62, the reverse gate 72, and the neutral gate 82 through the drive gate 92 to the alternate gate 102 when the pawl 44 of the shift lever 40 is in the retracted position 46.

In other instances, an operator may keep the shift button 34 actuated such that the pawl 44 is in the extended position 48 when the shift lever 40 is repositioned to the drive gate 92 from any of the park gate 62, the reverse gate 72, and the neutral gate 82. As shown in FIGS. 5A-5B, the gate blocker 110 is positioned to restrict the movement of the shift lever 40 through the drive gate 92 to the alternate gate 102 when the pawl 44 is in the extended position 48. As shown in FIG. 5A, the biasing member 120 positions the leg 112 of the gate blocker 110 in the nominal position to restrict the movement of the shift lever 40 when the pawl 44 is in the extended position 48. According to the exemplary embodiment shown in FIG. 5B, the gate blocker 110 rotates about the pin 130 (e.g., counterclockwise, etc.) into an inhibiting position from the nominal position in response to the interaction of the pawl 44 with the leg 112. As shown in FIG. 5B, the leg 112 prevents passage of the shift lever 40 through the drive gate 92 to the alternate gate 102 when the pawl 44 interacts with the first surface 113 of the leg 112 (e.g., when the pawl 44 is in the extended position 48, etc.) and the gate blocker 110 is in the inhibiting position. As shown in FIG. 5B, the interaction surface 116 of the leg 114 of the gate blocker 110 is configured to contact the retaining surface 140 when the pawl 44 interacts with the leg 112. The leg 114 limits movement (e.g., rotational movement, etc.) of the gate blocker 110 when the pawl 44 interacts with the leg 112 such that the leg 112 substantially blocks the passage between the drive gate 92 and the alternate gate 102. In an alternative embodiment, the leg 114 is omitted and the opposing second surface 115 of the leg 112 abuts retaining surface 94 of the drive gate 92 to substantially block the passage between the drive gate 92 and the alternate gate 102 when the pawl 44 interacts with the leg 112 of the gate blocker 110.

Figure 6:
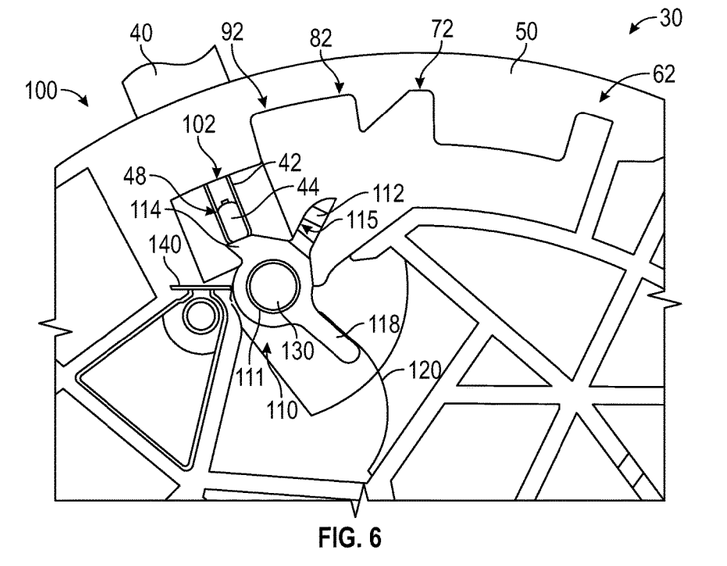
FIG. 6 is a cross-sectional view of the gear selector assembly of FIG. 1 in an alternate position, according to an exemplary embodiment.

As shown in FIG. 5C, the pawl 44 may be repositioned into the retracted position 46 (e.g., by releasing the shift button 34, etc.) such that the pawl 44 enters into the drive gate 92 and interacts with the retaining surface 94. The biasing member 120 returns the gate blocker 110 from the inhibiting position to the nominal position in response to the pawl 44 being repositioned (e.g., when the pawl 44 is not interacting with the leg 112). As shown in FIGS. 5C-6, the shift lever 40 may be repositioned into the alternate gate 102 from the drive gate 92 following the pawl 44 being positioned within the drive gate 92 (i.e., the pawl 44 is in the retracted position 46). According to the exemplary embodiment shown in FIGS. 5A-5C, at least one of the retaining surface 94 of the drive gate 92 and the leg 112 of the gate blocker 110 are positioned to prevent the shift lever 40 from being moved directly into the alternate gate 102 from any of the park gate 62, the reverse gate 72, and the neutral gate 82 without first being moved into the drive gate 92. This effectively prevents an operator from inadvertently shifting a transmission of a vehicle into the alternate mode of operation 100 (i.e., the operator must perform two separate conscious motions). According to an exemplary embodiment, actuating the shift button 34 repositions the pawl 44 of the shift lever 40 in the extended position 48 to facilitate moving the shift lever 40 to the alternate gate 102 from the drive gate 92 (i.e., the retaining surface 94 of the drive gate 92 and the first surface 113 of the leg 112 do not interact with the pawl 44 when the shift lever 40 is moved). According to an exemplary embodiment, rotationally biasing the gate blocker 110 towards the nominal position does not prevent the shift lever 40 from being repositioned from the drive gate 92 to the alternate gate 102. By way of example, repositioning the pawl 44 into the extended position 48 while in the drive gate 92 may cause the pawl 44 to interact with the opposing second surface 115 of the leg 112. This interaction may cause the gate blocker 110 to rotate (e.g., clockwise, etc.) about the pin 130 which facilitates moving the shift lever 40 to the alternate gate 102.

According to an exemplary embodiment, the shift lever 40 is able to be moved from the alternate gate 102 to the drive gate 92 or the neutral gate 82 with the pawl 44 in the retracted position 46 (i.e., the pawl 44 follows along the shift gate 50 until the pawl 44 interacts with retaining surface 84). According to another exemplary embodiment, the leg 112 of the gate blocker 110 facilitates passage of the shift lever 40 from the alternate gate 102 to any one of the drive gate 92, the neutral gate 82, the reverse gate 72, and the park gate 62 when the pawl 44 is in the extended position 48. The pawl 44 may interact with the opposing second surface 115 of the leg 112 when in the extended position 48. The interaction between the pawl 44 and the opposing second surface 115 of the leg 112 causes a clockwise rotation of the gate blocker 110 about the pin 130 thereby opening the passage from the alternate gate 102 into the rest of the shift gate 50.

In operation, the gear selector assembly 30 of FIGS. 2A-6 may operate as follows. An operator may perform a first motion to reposition the shift lever 40 from a first gate (e.g., the park gate 62, the reverse gate 72, the neutral gate 82, etc.) to a second gate (e.g., the drive gate 92, etc.). The first motion may include at least one of pressing a brake pedal (e.g., the vehicle may need to be stopped to change a mode of operation, etc.), actuating the shift button 34 (e.g., to reposition the pawl 44, etc.), and pulling back or pushing forward on the shift knob 32 (e.g., to select a mode of operation, etc.). Following the first motion, an operator may perform a second motion to reposition the gear selector from the second gate (e.g., the drive gate 92, etc.) to a third gate (e.g., the alternate gate 102, etc.). According to an exemplary embodiment, the shift lever 40 is prevented from being repositioned directly from the first gate to the third gate by at least one of a surface (e.g., the retaining surface 94, etc.) of the second gate and a gate blocker 110 adjacent the second gate. According to an exemplary embodiment, the surface of the second gate (e.g., the retaining surface 94, etc.) is positioned to prevent directly repositioning the shift lever 40 from the first gate to the third gate when the pawl 44 is in the retracted position 46. The gate blocker 110 may be positioned to prevent directly repositioning the shift lever 40 from the first gate to the third gate when the pawl 44 is in the extended position 48. The second motion may include at least one of actuating the shift button 34, pressing the brake pedal, and pulling back or pushing forward on the shift knob 32. According to an exemplary embodiment, the gate blocker 110 is rotationally biased towards a nominal position such that the gate blocker 110 does not prevent shift lever 40 from being repositioned from the second gate to the third gate while performing the second motion.

Figure 7:
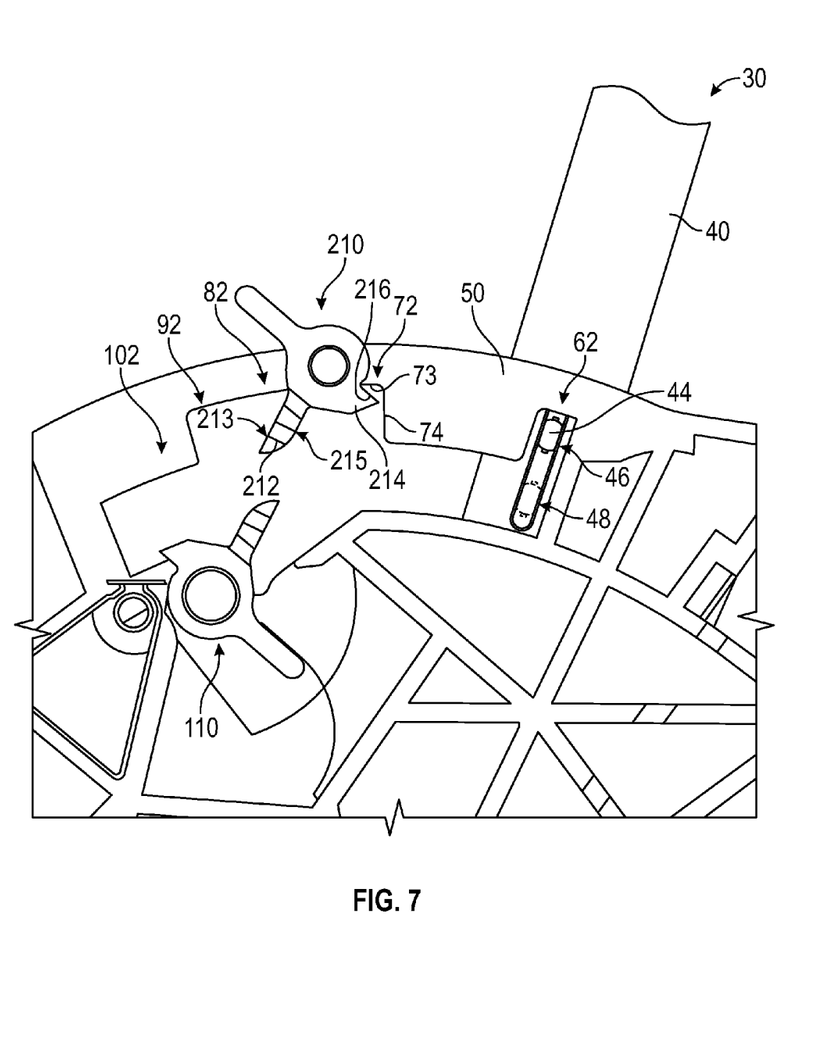
FIG. 7 is a detailed cross-sectional view of a gear selector assembly, according to an another exemplary embodiment.

According to the exemplary embodiment shown in FIG. 7, the gear selector assembly 30 includes a first gate blocker, shown as gate blocker 110, positioned adjacent the drive gate 92 and a second gate blocker, shown as gate blocker 210, positioned between the reverse gate 72 and the neutral gate 82. In alternative embodiments, the gear selector assembly 30 includes a different number of gate blockers (e.g., three, etc.) and/or the gate blockers are otherwise positioned along the shift gate 50. The gate blocker 210 may function in a similar manner to the gate blocker 110 described in FIGS. 2-6. In some embodiments, the gate blocker 110 is omitted. As shown in FIG. 7, the gate blocker 210 is positioned to replace the chamfered surface 76 of the reverse gate 72 (see, e.g., FIG. 3) and the retaining surface 84 of the neutral gate 82 (see, e.g., FIG. 4).

As shown in FIG. 7, the gate blocker 210 includes a first leg, shown as leg 212, and a second leg, shown as leg 214, that extend from a body of the gate blocker 210. According to an exemplary embodiment, gate blocker 210 is rotationally coupled to the shift gate 50 (e.g., via a fastener, etc.) to facilitate the rotation of gate blocker 210 relative to the shift gate 50. In other embodiments, the gate blocker 210 is otherwise coupled to the shift gate 50. According to an exemplary embodiment, the gate blocker 210 is positioned along the shift gate 50 such the leg 212 interacts with the pawl 44 while the pawl 44 is in the refracted position 46. An interaction of the pawl 44 with a first surface 213 of the leg 212 may selectively restrict the movement of the shift lever 40 through a portion of the shift gate 50 in a first direction while the pawl 44 is in the retracted position 46 (e.g., restricts movement of the shift lever 40 through the reverse gate 72 to the park gate 62, etc.). Conversely, an interaction of the pawl 44 with an opposing second surface 215 of the leg 212 may permit the passage of the shift lever 40 through the portion of the shift gate 50 in an opposing second direction while the pawl 44 is in the retracted position 46 (e.g., from the park gate 62 to the drive gate 92, etc.).

According to an exemplary embodiment, a surface, shown as interaction surface 216, of the leg 214 is positioned to interact with a surface of the reverse gate 72, shown as retaining surface 73. The contact between the interaction surface 216 of the leg 214 and the retaining surface 73 rotationally limits the movement of the gate blocker 210 when the leg 212 interacts with the pawl 44. Rotationally limiting the movement of the gate blocker 210 may effectively restrict the movement of the shift lever 40 through a first gate (e.g., the reverse gate 72, etc.) to a second gate (e.g., the park gate 62, etc.) of the shift gate 50. In some embodiments, the retaining surface 73 includes a dampening material (e.g., rubber, etc.) configured to reduce at least one of an impact load and noise generated from the contact between the interaction surface 216 of the leg 214 and the retaining surface 73. According to an exemplary embodiment, the gate blocker 210 includes a biasing member configured to bias the gate blocker 210 towards a nominal position (e.g., the position shown in FIG. 7, etc.). The biasing member may be or include a torsional spring, a compression spring, a leaf spring, a weight, and/or the like.

According to an exemplary embodiment, the gate blocker 210 is configured to selectively prevent an operator from shifting the shift lever 40 into and/or through the reverse gate 72. The opposing second surface 215 of the leg 212 is structured such that the shift lever 40 may be moved into or through the reverse gate 72 in a first direction (e.g., to the neutral gate 82, to the drive gate 92, from the park gate 62, etc.) with the pawl 44 in the retracted position 46 (or the extended position 48 where the pawl 44 may interact with the leg 112 of the gate blocker 110 as described above). The gate blocker 210 may be configured to selectively prevent shifting the shift lever 40 in a second direction. For example, the gate blocker 210 may prevent directly moving the shift lever 40 into or through the reverse gate 72 in the second direction (e.g., from the neutral gate 82, from the drive gate 92, to the park gate 62, etc.). The interaction surface 216 of the leg 214 of the gate blocker 210 is configured to contact the retaining surface 73 when the pawl 44 interacts with the first surface 213 of the leg 212. The leg 214 limits movement (e.g., rotational movement, etc.) of the gate blocker 210 when the pawl 44 interacts with first surface 213 of the leg 212 such that the leg 212 substantially blocks the passage of the shift lever 40 in the second direction when the pawl 44 is in the retracted position 46. According to an exemplary embodiment, the first surface 213 of the leg 212 does not interact with the pawl 44 of the shift lever 40 when the pawl 44 is in the extended position 48. The configuration shown in FIG. 7 may cause an operator to knowingly shift into the reverse mode of operation 70 or the park mode of operation 60. In some embodiments, the actuation of the pawl 44 to shift the shift lever 40 into the park gate 62 or the reverse gate 72 may require a brake pedal to be actuated such that the vehicle is stopped or substantially stopped before the transmission is put into reverse or park (e.g., from drive, etc.).

In an alternative embodiment, the gate blocker 210 may be configured to selectively prevent an operator from shifting directly from the reverse gate 72 to the drive gate 92 (e.g., while the vehicle is still moving backwards, without a brake pedal actuated, etc.). By way of example, the gear selector assembly 30 may include any number of gate blockers positioned to selectively prevent the movement of the shift lever 40 through a first gate to a second gate (e.g., from the park gate 62 through the drive gate 92 to the alternate gate 102, from the drive gate 92 through the neutral gate 82 to the reverse gate 72, etc.) and in any direction (e.g., in a first direction from the park gate 62 to the alternate gate 102, in a second opposing direction from the alternate gate 102 to the park gate 62, etc.).

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or movable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "forward," "backward," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A gear selector assembly, comprising:
a shift gate including a plurality of gates, each gate associated with a mode of operation of a vehicle;
a gear selector movable between the plurality of gates and including a pawl; and
a gate blocker positioned to restrictively interact with the pawl of the gear selector to selectively restrict movement of the gear selector through a first gate to a second gate, wherein the gate blocker has a unitary structure and is directly coupled to the shift gate by a pin about which the gate blocker rotates such that the gate blocker is translationally fixed;
wherein the gate blocker includes a biasing member configured to bias the gate blocker towards a nominal position; and
wherein the gate blocker is configured to not restrictively interact with the pawl to allow the gear selector to move from the first gate to the second gate when the gate blocker is in the nominal position.

2. The gear selector assembly of claim 1, wherein the pawl is repositionable between a first position and a second position.

3. The gear selector assembly of claim 2, wherein the pawl interacts with the first gate while the pawl is in the first position as the gear selector is moved through the first gate, and wherein the first gate restricts the movement of the gear selector from the first gate to the second gate while the pawl is in the first position.

4. The gear selector assembly of claim 2, wherein the pawl interacts with the gate blocker while the pawl is in the second position as the gear selector is moved through the first gate, and wherein the gate blocker restricts the movement of the gear selector through the first gate to the second gate while the pawl is in the second position as the gear selector is moved through the first gate.

5. The gear selector assembly of claim 2, wherein the gear selector is movable from the first gate to the second gate by repositioning the pawl from the first position to the second position while the gear selector is positioned at the first gate.

6. The gear selector assembly of claim 2, wherein the gate blocker is configured to restrict movement of the gear selector through a portion of the shift gate in a first direction when the pawl is in the first position, and wherein the gate blocker is configured to allow movement of the gear selector through the portion of the shift gate in a second direction when the pawl is in the first position or the second position.

7. The gear selector assembly of claim 1, wherein the gate blocker includes a leg that extends from a body of the gate blocker, wherein the leg prevents passage of the gear selector through the first gate to the second gate when the pawl interacts with a first surface of the leg.

8. The gear selector assembly of claim 7, wherein the leg facilitates passage of the gear selector from the second gate to the first gate when the pawl interacts with an opposing second surface of the leg.

9. The gear selector assembly of claim 7, wherein the gate blocker includes a second leg that extends from the body of the gate blocker, wherein the second leg is configured to contact a surface that limits movement of the gate blocker when the pawl interacts with the first surface of the first leg.

10. The gear selector assembly of claim 7, wherein the gate blocker includes a second leg configured to limit the movement of the gate blocker when the first leg interacts with the pawl of the gear selector.

11. The gear selector assembly of claim 1, wherein the first gate is associated with a drive mode of operation and the second gate is associated with at least one of a low, a manual, and a sport mode of operation.

12. The gear selector assembly of claim 1, wherein the biasing member includes at least one of a torsional spring, a leaf spring, and a weight configured to bias the gate blocker towards the nominal position.

13. The gear selector assembly of claim 1, wherein the gate blocker is rotationally coupled to the shift gate such that the gate blocker is configured to rotate relative to the shift gate when the pawl of the gear selector interacts with the gate blocker.

* * * * *